US012682173B2

(12) United States Patent
Jain et al.

(10) Patent No.: US 12,682,173 B2
(45) Date of Patent: Jul. 14, 2026

(54) MODULAR FRAMEWORK FOR EVALUATING LANGUAGE MODELS

(71) Applicant: INTUIT INC., Mountain View, CA (US)

(72) Inventors: Siddharth Jain, Mountain View, CA (US); Shraddhaben Padariya, Mountain View, CA (US); Venkat Narayan Vedam, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 202 days.

(21) Appl. No.: 18/592,494

(22) Filed: Feb. 29, 2024

(65) Prior Publication Data

US 2025/0278568 A1      Sep. 4, 2025

(51) Int. Cl.
*G06F 40/30*            (2020.01)
(52) U.S. Cl.
CPC ................................... *G06F 40/30* (2020.01)
(58) Field of Classification Search
CPC ...................................................... G06F 40/30
See application file for complete search history.

(56) References Cited

U.S. PATENT DOCUMENTS

2023/0297887 A1*  9/2023  Gurgu ................... G06N 20/00
                                                    706/12
2025/0053585 A1*  2/2025  Duran .................. G06F 16/334
2025/0265391 A1*  8/2025  Chen ...................... G06F 30/27

FOREIGN PATENT DOCUMENTS

CN          117520165 A  *  2/2024  ......... G06F 11/3604

* cited by examiner

*Primary Examiner* — Andrew C Flanders
*Assistant Examiner* — Shashidhar Shankar Manoharan
(74) *Attorney, Agent, or Firm* — Lathrop GPM LLP

(57)                  ABSTRACT
Aspects of the invention provide a method, computer system, and computer program product for evaluating language model responses. A set of user-defined objectives for evaluating model responses generated by a large language model is received. The objectives include semantic accuracy, grammatical soundness, and expert alignment. A set of evaluation metrics are selected from a predefined library based on the user-defined objectives. Evaluation scores are determined for model responses generated by a large language model using the selected set of metrics. The evaluation scores include a semantic score and a lexical score. A composite score is calculated from the evaluation scores. The composite score is adjusted for divergences between the semantic score and the lexical score. A set of hyperparameters of the large language models is tuned based on the composite score. The tuning customizes the large language model according to the user-defined objectives.

17 Claims, 4 Drawing Sheets

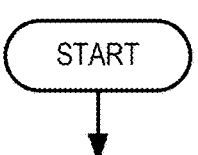

START

RECEIVE A SET OF USER-DEFINED OBJECTIVES EVALUATING MODEL RESPONSES GENERATED BY A LARGE LANGUAGE MODEL, WHERE THE OBJECTIVES INCLUDE SEMANTIC ACCURACY, GRAMMATICAL SOUNDNESS, AND EXPERT ALIGNMENT
*Block 210*

BASED ON THE USER-DEFINED OBJECTIVES, SELECT A SET OF EVALUATION METRICS FROM A PREDEFINED LIBRARY
*Block 220*

DETERMINE, USING THE SELECTED SET OF METRICS, EVALUATION SCORES FOR MODEL RESPONSES GENERATED BY A LARGE LANGUAGE MODELS, WHERE THE EVALUATION SCORES INCLUDE A SEMANTIC SCORE AND A LEXICAL SCORE
*Block 230*

CALCULATE A COMPOSITE SCORE FROM THE DETERMINED EVALUATION SCORES, WHERE THE COMPOSITE SCORE IS ADJUSTED FOR DIVERGENCES BETWEEN THE SEMANTIC SCORE AND THE LEXICAL SCORE
*Block 240*

TUNE A SET OF HYPERPARAMETERS OF THE LARGE LANGUAGE MODELS BASED ON THE COMPOSITE SCORE, WHERE THE TUNING CUSTOMIZES THE LARGE LANGUAGE MODEL ACCORDING TO THE USER-DEFINED OBJECTIVES
*Block 250*

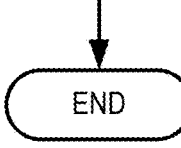

END

*FIG. 2*

Computing
System
400

MODULAR FRAMEWORK FOR EVALUATING LANGUAGE MODELS

BACKGROUND

The advent of language models has revolutionized the field of natural language processing (NLP), enabling machines to perform a wide range of linguistic tasks that were once the exclusive domain of human expertise. These tasks include, but are not limited to, text generation, translation, summarization, and question answering. These models, often built upon deep learning architectures, have been trained on extensive corpuses of text data, allowing them to learn complex patterns of language use and context.

However, as the capabilities of these language models, particularly the large language models (LLMs), have grown, so too have the challenges associated with evaluating their performance. Traditional evaluation metrics often fall short in providing a comprehensive assessment of a model's output. For example, metrics like BLEU and ROUGE, for instance, are primarily focused on lexical similarities and do not fully capture semantic nuances. Other evaluation metrics, such as the BERT-Score, focus on semantic understanding but may neglect syntactic and grammatical correctness. Moreover, many of these metrics do not adequately address the real-world applicability of the models' responses, nor do the metrics provide a clear ability to compare the outputs against the high-quality standards set by human experts in various domains.

SUMMARY

In general, in one aspect, one or more embodiments related to a method for evaluating language model responses. The method includes receiving a set of user-defined objectives for evaluating model responses generated by a large language model. The objectives include semantic accuracy, grammatical soundness, and expert alignment. The method further includes selecting a set of evaluation metrics from a predefined library based on the user-defined objectives. The method additionally includes determining evaluation scores for model responses generated by a large language model using the selected set of metrics. The evaluation scores include a semantic score and a lexical score. The method also includes calculating a composite score from the evaluation scores. The composite score is adjusted for divergences between the semantic score and the lexical score. The method further includes tuning a set of hyperparameters of the large language models based on the composite score. The tuning customizes the large language model according to the user-defined objectives.

In another aspect, one or more embodiments relate to a system comprising a computer processor, a memory, and instructions stored in the memory. The instructions are executable by the computer processor to cause the computer processor to perform operations. The operations include receiving a set of user-defined objectives for evaluating model responses generated by a large language model. The objectives include semantic accuracy, grammatical soundness, and expert alignment. The operations further include selecting a set of evaluation metrics from a predefined library based on the user-defined objectives. The operations additionally include determining evaluation scores for model responses generated by a large language model using the selected set of metrics. The evaluation scores include a semantic score and a lexical score. The operations also include calculating a composite score from the evaluation scores. The composite score is adjusted for divergences between the semantic score and the lexical score. The operations further include tuning a set of hyperparameters of the large language models based on the composite score. The tuning customizes the large language model according to the user-defined objectives.

In yet another aspect, one or more embodiments related to a computer program product comprising non-transitory computer-readable program code that, when executed by a computer processor of a computing system, cause the computing system to perform operations. The operations include receiving a set of user-defined objectives for evaluating model responses generated by a large language model. The objectives include semantic accuracy, grammatical soundness, and expert alignment. The operations further include selecting a set of evaluation metrics from a predefined library based on the user-defined objectives. The operations additionally include determining evaluation scores for model responses generated by a large language model using the selected set of metrics. The evaluation scores include a semantic score and a lexical score. The operations also include calculating a composite score from the evaluation scores. The composite score is adjusted for divergences between the semantic score and the lexical score. The operations further include tuning a set of hyperparameters of the large language models based on the composite score. The tuning customizes the large language model according to the user-defined objectives.

Other aspects of the invention will be apparent from the following description and the appended claims.

BRIEF DESCRIPTION OF DRAWINGS

FIG. 2 shows a flow chart for evaluating language model responses according to illustrative embodiments.

Like elements in the various figures are denoted by like reference numerals for consistency.

DETAILED DESCRIPTION

In general, the description is directed to evaluating language model responses. More particularly, the embodiments describe an advanced framework may evaluate language models more holistically, considering the multifaceted nature of language and communication. The framework balances semantic and lexical evaluation, adapt to the specific requirements of different applications, and benchmark against the nuanced understanding and output quality of human experts.

In some embodiments, a modular and extensible framework is provided for evaluating language models, particularly in scenarios where the generated output is compared with responses provided by human subject matter experts for, e.g., evaluating and improving generative Artificial Intelligence (AI) based experiences. The framework provides a structured approach to evaluating Large Language Models (LLMs) in a manner that addresses both semantic and lexical qualities, while also incorporating human expert benchmarks for comparison.

Through a modular selection process, tailored preprocessing, and nuanced score calculations, the methodology of the description offers a robust evaluation framework. The mathematical foundations that underscore the framework allow for fine-tuning and iterative refinement to adapt to various use-cases and data distributions.

The framework described herein enables the evaluation and tuning of language models to numerous real-world applications with different communication objectives. For example, in the customer service industry, the framework can be used to tailor the capabilities of AI-powered chatbots, enabling them to understand and respond to customer queries with unprecedented accuracy and relevance. The interactions with service bots become more conversational and contextually aware, closely mirroring human agents. In the realm of content creation, the framework may automate the production of written content that is both contextually relevant and stylistically precise. Language models can be tuned according to specific lexical and semantic standards, whether for summarizing extensive articles into concise reports or generating accurate and coherent technical documents.

Figure 1:
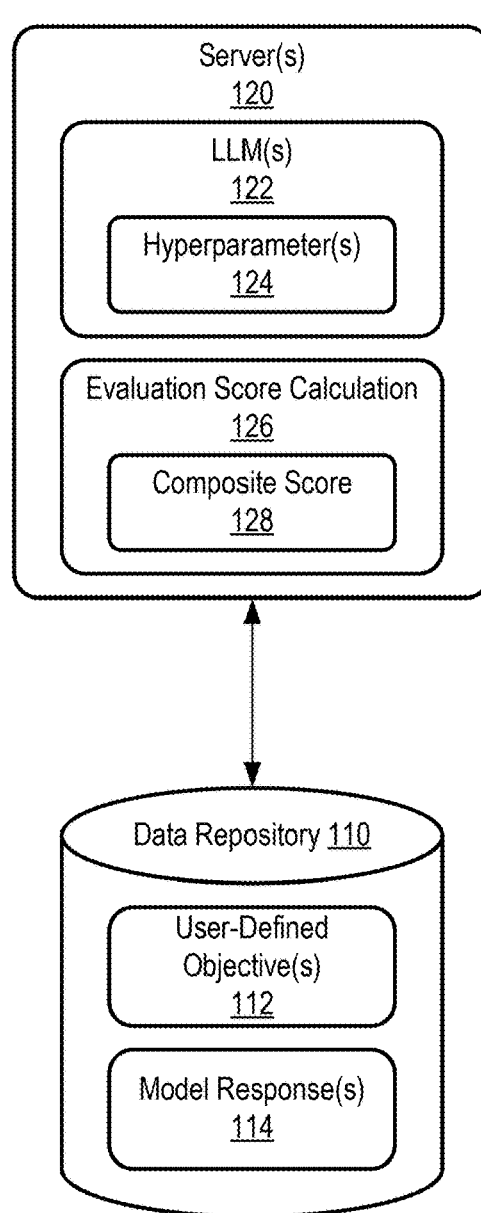
FIG. 1 shows a block diagram for a high-level system architecture according to illustrative embodiments.

Turning to FIG. 1, a block diagram for a high-level system architecture according to illustrative embodiments. The system architecture of FIG. 1 provides aa framework for evaluating language models. As shown, the system architecture includes data repository (110) and server(s) (120).

In one or more embodiments of the invention, the data repository (110) is any type of storage unit and/or device (e.g., a file system, database, data structure, or any other storage mechanism) for storing data. Further, the data repository (110) may include multiple different, potentially heterogeneous, storage units and/or devices.

The data repository (110) stores data for the evaluation process. As illustrated, this data includes user-defined objectives (112) and model responses (114).

The user-defined objectives (112) is data comprising various evaluation targets that a user wants to assess in language model outputs. The user-defined objectives (112) is a set of parameters or directives that define what aspects of the language model's performance are important for the user's specific needs. In other words, the User-Defined Objectives (112) represent a set of criteria or goals established by users to guide the evaluation of language models.

The user-defined objectives (112) could range from general linguistic quality measures, such as fluency and grammaticality, to more specialized criteria, such as domain-specific accuracy or alignment with certain stylistic guidelines. These objectives are quantifiable, allowing the evaluation framework to generate measurable scores against each target. For example, the user-defined objectives (112) might include, but is not limited to, semantic accuracy, lexical richness, coherence, consistency, tone, and relevance to a particular domain or context.

Model responses (114) textual data points that embody a language model's capabilities in terms of syntax, semantics, context understanding, and task-specific performance. The Model responses (114) are created by a language model in response to a series of input prompts. The responses can be sentences, paragraphs, or longer text passages that the language model generates. The content of these responses is contingent upon the language model's training, design, and the specific input provided to the model. The model responses (114) may encompass a wide spectrum of language use, from simple factual replies to complex discourse.

The server(s) (120) is one or more physical or virtualized machines for hosting and executing language model algorithms and managing the data processing required for the evaluation framework. The server(s) (120) may include multi-core CPUs and/or specialized hardware like GPUs or TPUs to accelerate machine learning and natural language processing (NLP) tasks. The server(s) (120) may host a suite of software and services, including machine learning libraries and frameworks, database management systems, and web servers to manage API calls needed to interface with external clients.

The servers (120) may host one or more large language models (LLMs) (122). LLM(s) (122) are advanced language processing algorithms built using deep learning techniques, typically leveraging architectures such as transformers that are trained on vast datasets to capture a wide array of linguistic patterns and nuances. These models may be instantiated using machine learning frameworks, such as TensorFlow or PyTorch, which facilitate the construction, training, and deployment of neural network models. The LLM's may be integrated into various applications or services through APIs designed using protocols such as REST for synchronous requests or WebSockets for continuous two-way communication.

Evaluation Score Calculation (126) is software or a blended hardware/software solution that serves as the analytical component for evaluating LLM's outputs using various metrics. Based on the user-defined objectives and hyperparameters, the Evaluation Score Calculation (126) calculates evaluation scores for the different parameters of the user-defined objectives (112).

Evaluation Score Calculation (126) may use custom algorithms or leveraging existing NLP libraries to perform tasks such as text analysis, similarity measurement, and quality scoring. For example, Evaluation Score Calculation (126) may compute evaluation metrics using statistical methods or leveraging specialized frameworks, such as NLTK for lexical analysis or SpaCy for semantic processing.

The composite score (128) is a weighted combination of multiple evaluation scores, adjusted by a penalty term to account for divergence between the scores. The composite score (128) synthesizes individual scores into a single score that provides a holistic measure of the LLM's performance.

The composite score (128) is designed to evaluate the performance of Large Language Models (LLMs) in a manner that integrates multiple performance metrics, weighted according to the user-defined objectives (112). individual metrics such as a ROGUE score or a BLEU score focus on semantic understanding, while metrics such as a BERT-Score, a BART-Score, or a METEOR score focus on lexical accuracy.

Unlike other metrics, the composite score (128) considers multiple aspects, providing a more nuanced evaluation of an LLM's output. The composite score (128) integrates both lexical and semantic components into a single unified score, providing a more comprehensive approach to evaluation compared to individual metrics.

The composite similarity may be a composite similarity ($S_{comp}$), calculated as follows:

$$S_{comp} = \frac{(\alpha * (S_{lex} + b_{lex})^{p_{lex}} + (1 - \alpha) * \alpha * (S_{sem} + b_{sem})^{p_{sem}})^{\frac{1}{p}}}{1 + \lambda \times penalty} \qquad \text{Equation 1}$$

wherein:
$S_{comp}$ is the composite similarity;
$\alpha$ is a weighted hyperparameter;
$S_{lex}$ is a lexical similarity;
$b_{lex}$ is a lexical bias;
$p_{lex}$ is a lexical tuning hyperparameter;

$S_{sem}$ is the semantic similarity;

$b_{sem}$ is a semantic bias;

$p_{sem}$ is a semantic tuning hyperparameter;

p is a mean behavior scaling factor;

$\lambda$ is a penalty scaling factor; and penalty is corrective factor for $S_{lex}$-$S_{sem}$ divergence.

The lexical similarity $S_{lex}$ is a measure of how closely the LLM's response matches a reference response in terms of word choice and order. Lexical similarity can be evaluated using metrics such as IDF or ROUGE score.

The semantic similarity $S_{sem}$ is an assessment of the meaning behind the words. Semantic similarity can be evaluated by context-aware metrics such as BERT-Score or BART Score.

The hyperparameters $\alpha$, $b_{lex}$, $p_{lex}$, $b_{sem}$ and $p_{sem}$ allow for fine-tuning of the evaluation to cater to specific use cases or preferences. Previous metrics lack this level of customization. The use of power and bias terms to adjust the contribution of individual scores allows the metric to be more sensitive to specific evaluation goals, such as emphasizing precision or recall.

The weighted hyperparameter $\alpha$ balances the contribution of lexical and semantic similarities. The hyperparameter is normalized, such that $\alpha$ values closer to 1 favor lexical similarity, whereas $\alpha$ values closer to 0 would favor semantic similarity.

The bias terms $b_{lex}$ and $b_{sem}$ are used to adjust the baseline contribution of the lexical and semantic components. The bias terms may aide in handling edge cases or specific tendencies in a corpus.

The power terms $p_{lex}$ and $p_{sem}$ are exponents that control the sensitivity of the composite score relative to the individual lexical and semantic scores. A power term greater than 1 amplifies higher scores (quadratic mean), while a term less than 1 makes the metric more sensitive to smaller scores.

The penalty is a probability-based correction factor that accounts for the divergence between lexical and semantic evaluations. The penalty may be calculated using Kernel Density Estimation (KDE).

The penalty term adjusts the overall score based on the coherence between lexical and semantic assessments. The penalty serves as a corrective term that adjusts the composite score based on the degree of divergence between lexical and semantic assessments. If there is a significant divergence between the $S_{lex}$ and $S_{sem}$, the penalty term will lower the composite similarity $S_{comp}$, indicating that the LLM's response may not be well-balanced in terms of both lexical choice and semantic meaning.

In some embodiments, the penalty is a joint probability of lexical and semantic in a text segment pair, obtained through Kernel Density Estimation (KDE). The penalty can then be calculated as:

$$penalty = -\log P(\text{lexical, semantic}) \qquad \text{Equation 2}$$

wherein P (lexical, semantic) is the joint probability of lexical similarity $S_{lex}$ and semantic similarity $S_{sem}$ in a text segment pair, obtained through Kernel Density Estimation (KDE).

While FIG. 1 shows a configuration of components, other configurations may be used without departing from the scope of the invention. For example, various components may be combined to create a single component. As another example, the functionality performed by a single component may be performed by two or more components.

Referring now to FIG. 2, a flow chart for evaluating language model responses is shown according to embodiments of the description. The method shown in the flow chart of FIG. 2 may be implemented in one or more of the components shown in FIG. 1

At block 210, a set of user-defined objectives is received for evaluating model responses generated by a large language model. The objectives include semantic accuracy, grammatical soundness, and expert alignment;

The user defined objectives may be user-defined objectives (112) shown in block form in FIG. 1. The user may define the set of objectives to guide the evaluation of language model responses. These objectives typically include criteria such as semantic accuracy, grammatical soundness, and alignment with expert opinions. Implementation of this step involves capturing user inputs through a user interface or API, where users may specify their objectives in a structured format, such as JSON or XML. These objectives are then stored in a data repository, within a relational database or a NoSQL database, which manages dynamic schema associated with user-defined criteria.

At block 220, a set of evaluation metrics are selected from a predefined library based on the user-defined objectives. This library may be a collection of NLP tools and algorithms, such as BLEU for grammatical evaluation, BERT-Score for semantic accuracy, and custom models for expert alignment. The selection process may be automated, guided by the user-defined objectives, and involves a rule-based system or a recommendation algorithm that maps objectives to the most suitable metrics. The selected metrics are then prepared for execution, such as by loading of the necessary machine learning models into memory or the configuration of the evaluation algorithms.

At block 230, evaluation scores are determined using the selected set of metrics, the evaluation scores include a semantic score and a lexical score for model responses generated by the large language models. Computation of the evaluation scores for the responses generated by a language model may involve running the model responses through each evaluation metric to obtain scores that reflect semantic and lexical quality. For example, for semantic scoring, models like BERT or GPT-3 might be used to obtain embeddings that are then compared for similarity. For lexical scoring, algorithms may count n-gram overlaps or use parse trees to assess grammatical structure. In some embodiments, the semantic score is calculated from evaluation metrics. The evaluation metrics may be, for example, a ROGUE score and/or a BLEU score.

A ROUGE (Recall-Oriented Understudy for Gisting Evaluation) score measures the overlap between the output, assessing the quality of summaries by comparing them to human-generated reference summaries. A higher overlap signifies better summarization. In the most common variants of ROUGE, ROUGE-N calculate the overlap of n-grams between the text generated by the model and the reference texts. ROUGE-L focuses on the longest common subsequence.

BLEU (Bilingual Evaluation Understudy) is a metric for evaluating a generated sentence to a set of reference sentences. BLEU measures the quality of machine-generated translation at the corpus level, assuming that the closer a translation is to a professional human translation, the better it is.

BLEU compares each candidate sentence with the reference sentences and counts the maximum number of times a given n-gram (a sequence of n words) appears in any single reference sentence. This count is then compared with the number of times each n-gram appears in the candidate sentence to calculate a precision score for each n-gram size (typically 1 to 4). The precision scores are then averaged over the entire corpus. The final BLEU score is computed by taking the geometric mean of the n-gram precision scores and multiplying by a brevity penalty that penalizes shorter generated sentences.

In some embodiments, the lexical score is calculated from evaluation metrics. The evaluation metrics can be, for example, a BERT-Score, a BART-Score, and/or a METEOR score.

The BERT-Score (Bidirectional Encoder Representations from Transformers) leverages the pre-trained contextual embeddings from BERT and matches words in candidate and reference sentences by cosine similarity. BERT computes the precision, recall, and F1 score by comparing the BERT embeddings of the language model's output with those of a reference text. The BERT-Score is useful for assessing the semantic quality of text, as it captures the context of words rather than just their presence or frequency.

The BART Score (Bidirectional and Auto-Regressive Transformers) is similar to BERT-Score but uses the BART model. Calculation of the BART Score involves comparing the BART embeddings of candidate text to reference text and scoring the similarity.

The METEOR Score (Metric for Evaluation of Translation with Explicit Ordering) calculates alignment between the model's output and reference translations by considering exact, stem, synonym, and paraphrase matches, then computes a score based on these alignments. The METEOR Score was designed to addresses some of the shortcomings of BLEU by incorporating synonyms and stemming, and by directly aligning words and phrases. The metric is used to provide a more nuanced evaluation of translation quality, considering more linguistic features than BLEU.

At block 240, a composite score is calculated from the evaluation scores. The composite score is adjusted for divergences between the semantic score and the lexical score. The composite score is the composite score (128) of FIG. 1, integrating the semantic and lexical scores. As described above, the composite score is calculated using a weighted formula that factors in the user-defined importance of the individual semantic and lexical scores and adjusting for divergences between the semantic and lexical scores. The adjustment may involve statistical models that can identify and quantify divergence.

At block 250, a set of hyperparameters of the large language models is tuned based on the composite score. The tuning customizes the large language model according to the user-defined objectives. The tuning process may involve machine learning techniques such as grid search, random search, or Bayesian optimization to find the optimal set of hyperparameters that align the model's performance with the user objectives. For example, the tuning process may apply one or more optimization algorithms. These optimization algorithms may be, for example, a Bayesian optimization, gradient descent, or evolutionary algorithms. Thus, the tuning may be an iterative process, potentially involving multiple rounds of evaluation and adjustment, requiring the system to modify the language model configuration and re-evaluate the outputs until a desired performance is achieved.

While the various steps in this flowchart are presented and described sequentially, at least some of the steps may be executed in different orders, may be combined, or omitted, and at least some of the steps may be executed in parallel. Furthermore, the steps may be performed actively or passively.

Figure 3:
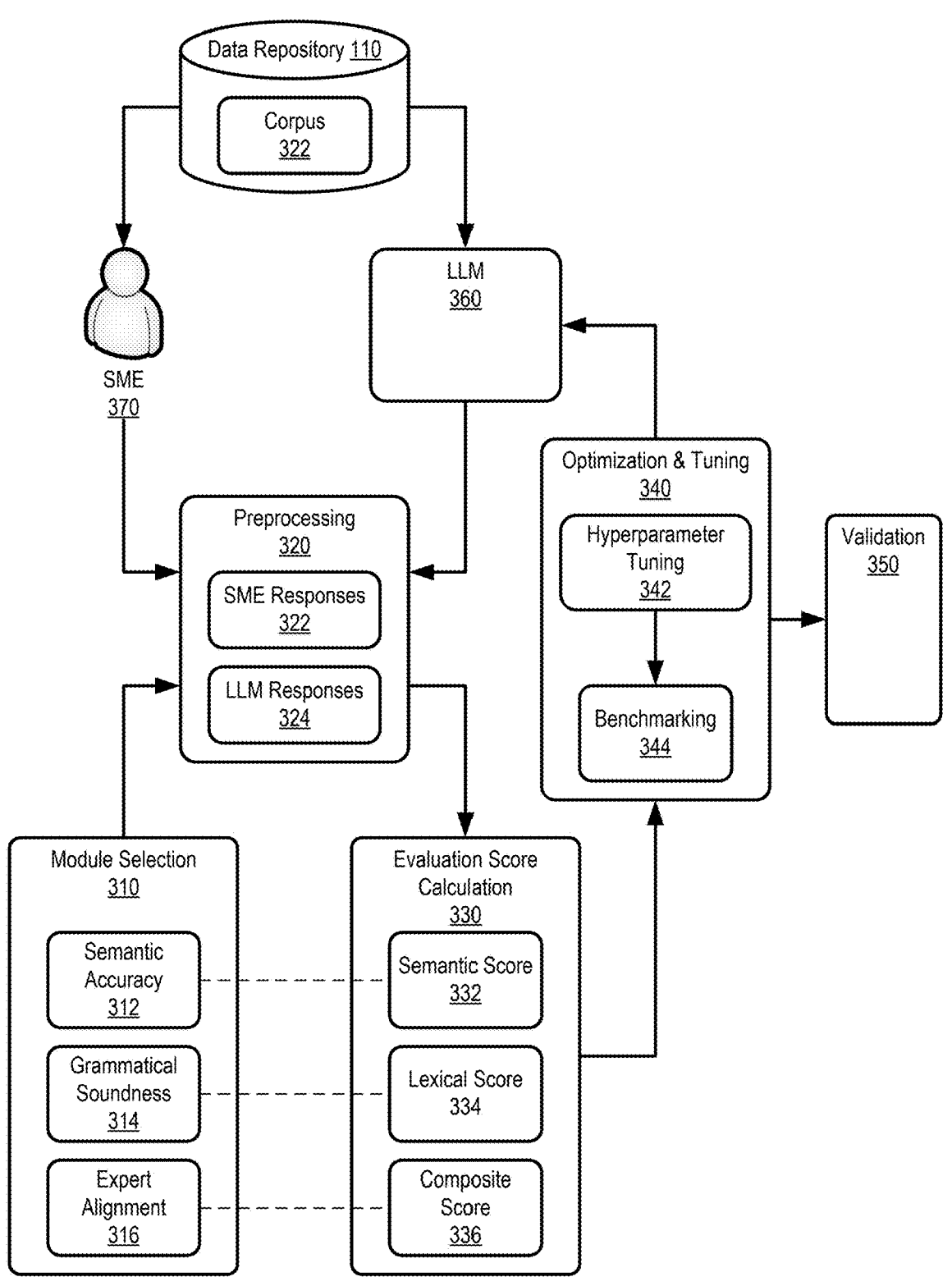
FIG. 3 shows a framework implementing multiple use cases according to illustrative embodiments.

Turning to FIG. 3, a framework is shown according to illustrative embodiments. FIG. 3 is one example of the architecture of FIG. 1 and outlines a framework may be tailored to various use cases by emphasizing various aspects of language understanding and generation—semantic and lexical proficiency.

At Preprocessing (320), SME Responses (322) from Subject Matter Experts (SME) (370) and LLM Responses (324) generated by large language models (LLM) (360) are collected and prepared for evaluation.

Preprocessing (320) normalizes and prepares the input data for the evaluation process. For SME responses, Preprocessing (320) may involve data collection tools and methods to ensure that the responses are representative and of high quality. For LLM responses, Preprocessing (320) may require the language model to generate outputs based on the same prompts given to the SMEs. Preprocessing (320) may also involve aligning the data pairs (SME and LLM responses) for direct comparison, using data alignment protocols or custom scripts written in Python or another suitable programming language. Text normalization techniques such as tokenization, stemming, and lemmatization may be implemented using natural language processing (NLP) libraries like NLTK or SpaCy.

At module selection (310), one or more modules are selected based on evaluation objectives. The modules are categorized into semantic accuracy (312), grammatical soundness (314), and expert alignment (316). Each of these modules corresponds to various aspects of the evaluation: semantic meaning, grammatical correctness, and alignment with human expert responses.

At module selection (310), evaluation objectives are defined, and appropriate metrics are chosen. module selection (310) may involve a user interface or command-line application where users may specify their objectives and select from various pre-implemented evaluation modules. These modules may include metrics like TF-IDF for textual relevance, BERT-Score for semantic evaluation, and others like ROUGE or BLEU for grammatical soundness. The user's choices would determine which evaluation paths are taken in subsequent steps, and this component would interact with both the preprocessing and evaluation score calculation components, passing the necessary parameters and data.

Evaluation score calculation (330) computes various scores based on the selected modules. For example, semantic score (332) is calculated to evaluate how semantically similar the LLM responses are to the SME responses. Lexical score (334) assesses the lexical similarity. Composite score (336) is a combination of semantic and lexical scores, adjusted by a penalty term to account for divergence between the two types of scores.

Evaluation score calculation (330) integrates the various individual metrics into a unified composite score (336), optionally adjusted by a penalty term. Evaluation score calculation (330) may be implemented in a mathematical framework for handling weighted averages, probability distributions, and/or custom algorithm, using a statistical computing framework like R or Python's SciPy to calculate the composite score (336).

Optimization & Tuning (340) includes hyperparameter tuning (342) and benchmarking (344) to refine the evaluation system. Optimization & Tuning (340) could leverage machine learning optimization techniques such as Bayesian optimization, gradient descent, or evolutionary algorithms, using libraries like Scikit-learn or TensorFlow.

Hyperparameter tuning (342) involves adjusting various parameters to improve the evaluation framework's performance. The hyperparameters are adjusted based on performance feedback from a feedback loop with the validation component.

At Benchmarking (344), the framework is evaluated against real-world data or predefined standards to validate its efficacy. Optimization & Tuning (340) interacts with the real-world datasets to benchmark the evaluation framework's performance, necessitating a system that can process large datasets and run multiple iterations of the evaluation for tuning purposes.

At validation (350), the composite score is with stand-alone metrics. For example, a comparison algorithm and/or statistical tests may be used to determine the framework's effectiveness, leveraging libraries such as Pandas for data manipulation and SciPy for statistical tests.

Validation (350) integrates with all previous components, collecting results from each to compile comprehensive performance data. One or more feedback loops may be implemented to continuously refine the framework. For example, feedback obtained from validation (350) may loop back to the Optimization & Tuning (340) to refine the evaluation framework iteratively.

In each use cases that follow, the balance between semantic and lexical scores is adjusted to prioritize the elements of language that are most important for the task at hand, illustrating the versatility of the evaluation framework to adapt to diverse linguistic requirements.

Practical Use Case: Legal Document Generation

In this first use case, the focus is on grammatical soundness and precision of language use. Module selection (310) would prioritize grammatical soundness (314). During the evaluation score calculation, the lexical score (334) would be weighted more heavily. Optimization & tuning (340) would further refine the hyperparameters of the LLM (360) to align with the requirements of legal verbiage, ensuring that the composite score (336) reflects the high grammatical standards expected in legal contexts. Benchmarking (344) is calculated based on a corpus of legal texts to ensure that the language model's output meets the industry's specific linguistic demands.

Practical Use Case: Chatbot for Customer Service

In the second use case, the chatbot needs to understand and respond to a variety of customer inquiries, making semantic understanding more important than lexical accuracy. Semantic Accuracy (312) would be the focus in module selection (310), and the semantic score (332) would receive a higher weighting during score calculation. The LLM (360) would be optimized to understand context and intent more deeply, ensuring that responses are relevant and accurately address customer concerns. Validation (350) may involve comparing the chatbot's performance against real-world interactions to ensure effectiveness in a live environment.

Practical Use Case: Creative Writing Assistant

In this third use case, a balance between semantic creativity and lexical richness may be beneficial. Both semantic accuracy (312) and grammatical soundness (314) would be important in module selection (310). The evaluation score calculation (330) would balance semantic score (332) and lexical score (334) to ensure the LLM (360) generates text that is both imaginative and stylistically diverse. Hyperparameter tuning (342) would adjust the LLM (360) to produce novel ideas and maintain coherent storylines. Benchmarking (344) might involve comparing the model's output with a database of literary works.

Practical Use Case: Technical Manual Creation

Technical manuals require precise terminology and clarity, which means a high lexical score is important. In this use case, Lexical Score (334) might be emphasized for technical accuracy, but not at the complete expense of semantic score (332). Hyperparameter tuning (342) would aim to balance between using the correct technical terms (lexical) and ensuring the instructions are semantically clear.

Practical Use Case: News Article Summarization

In this use case, the system must extract the semantic essence of articles, i.e., Semantic Accuracy (312) while also maintaining the lexical integrity of the original content, i.e., grammatical soundness (314). The composite score (336) would weigh both semantic score (332) and lexical score (334) to ensure summaries are both representative of the original articles and linguistically sound. During optimization & tuning (340), benchmarks could include a set of human-written summaries to ensure the language model's outputs are of a comparable quality.

Figure 4A:
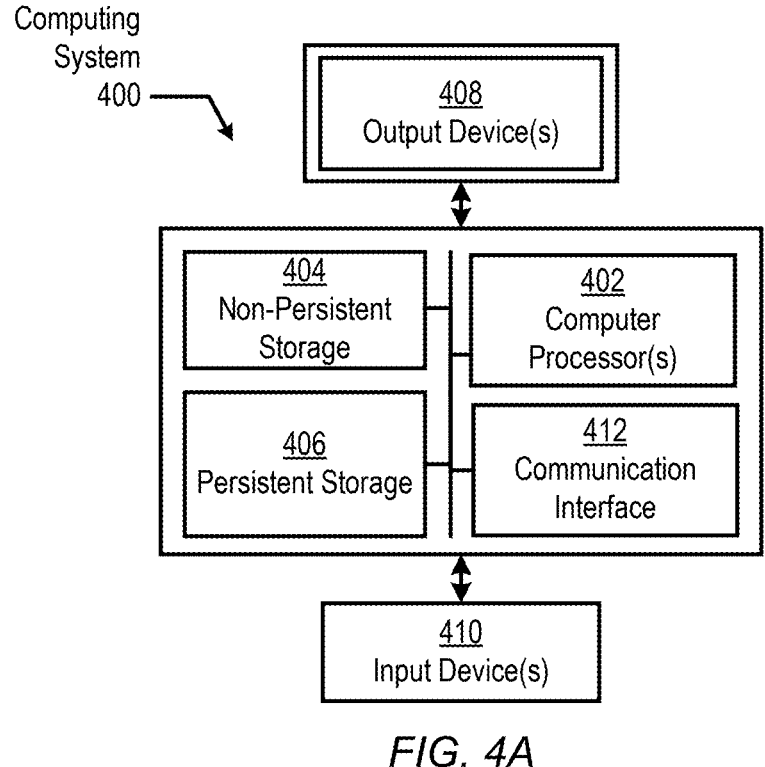
FIG. 4A and FIG. 4B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 4A, the computing system (400) may include one or more computer processors (402), non-persistent storage (404), persistent storage (406), a communication interface (408) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) may be one or more cores or micro-cores of a processor. The computer processor(s) (402) includes one or more processors. The one or more processors may include a central processing unit (CPU), a graphics processing unit (GPU), a tensor processing unit (TPU), combinations thereof, etc.

The input devices (410) may include a touchscreen, keyboard, mouse, microphone, touchpad, electronic pen, or any other type of input device. The input devices (410) may receive inputs from a user that are responsive to data and messages presented by the output devices (412). The inputs may include text input, audio input, video input, etc., which may be processed and transmitted by the computing system (400) in accordance with the disclosure. The communication interface (408) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the output devices (412) may include a display device, a printer, external storage, or any other output device. One or more of the output devices may be the same or different from the input device(s). The input and output device(s) may be locally or remotely connected to the computer processor(s) (402). Many diverse types of computing systems exist, and the aforementioned input and output device(s) may take other forms. The output devices (412) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 4B:
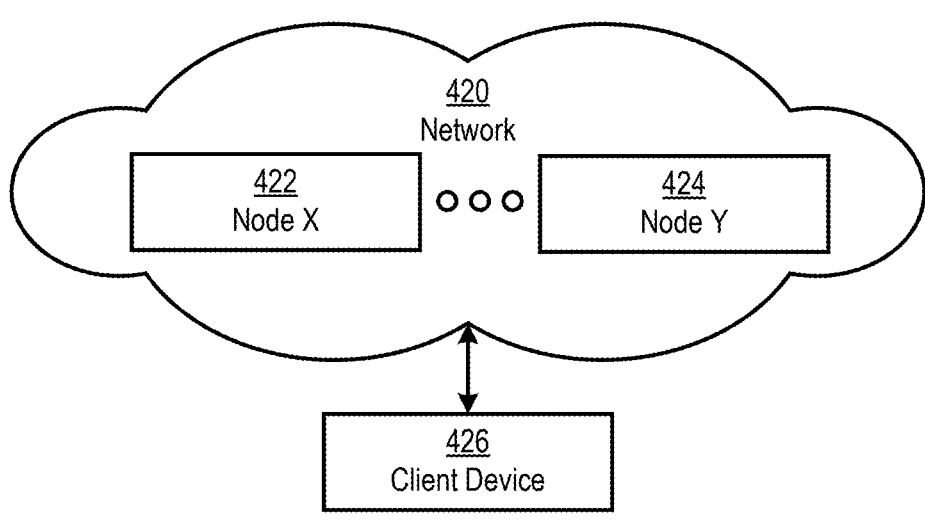

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422), node Y (424)) in the network (420) may be configured to provide services for a client device (426), including receiving requests and transmitting responses to the client device (426). For example, the nodes may be part of a cloud computing system. The client device (426) may be a computing system, such as the computing system shown in FIG. 4A. Further, the client device (426) may include and/or perform all or a portion of one or more embodiments.

The computing system of FIG. 4A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method for improving a performance of a large language model with respect to a set of user-defined objectives, the method comprising:

receiving the set of user-defined objectives for evaluating model responses generated by the large language model, wherein the set of user-defined objectives include at least one from semantic accuracy, grammatical soundness, and expert alignment;

based on the user-defined objectives, selecting a set of evaluation metrics from a predefined library;

determining, using the selected set of evaluation metrics, evaluation scores for model responses generated by a large language model, wherein the evaluation scores include a semantic score and a lexical score;

calculating a composite score from the evaluation scores, wherein the composite score is adjusted for divergences between the semantic score and the lexical score, wherein the composite score is calculated as:

$$S_{comp} = \frac{(\alpha * (S_{lex} + b_{lex})^{p_{lex}} + (1 - \alpha) * \alpha * (S_{sem} + b_{sem})^{p_{sem}})^{\frac{1}{p}}}{1 + \lambda \times penalty}$$

wherein:

$S_{comp}$ is the composite similarity:

$\alpha$ is a weighted hyperparameter;

$S_{lex}$ is a lexical similarity;

$b_{lex}$ is a lexical bias;

$p_{lex}$ is a lexical tuning hyperparameter;

$S_{sem}$ is the semantic similarity;

$b_{sem}$ is a semantic bias;

$p_{sem}$ is a semantic tuning hyperparameter;

p is a mean behavior scaling factor;

$\lambda$ is a penalty scaling factor; and penalty is corrective factor for $S_{lex}$-$S_{sem}$ divergence; and tuning a set of hyperparameters of the large language models based on the composite score, wherein the tuning customizes the large language model according to the user-defined objectives by aligning the performance of the large language model according to the user-defined objectives.

2. The method of claim 1, further comprising:

collecting a set of evaluation data, wherein the evaluation data includes responses from subject matter experts and the model responses generated by the large language models;

preprocessing the collected evaluation data, wherein the preprocessing includes one or more natural language processing techniques to normalize and tokenize the evaluation data.

3. The method of claim 1, wherein the semantic score is calculated from evaluation metrics selected from a ROGUE score, a BLEU score, and combinations thereof.

4. The method of claim 1, wherein the lexical score is calculated from evaluation metrics selected from a BERT-Score, a BART-Score, a METEOR score, and combinations thereof.

5. The method of claim 1, wherein tuning the set of hyperparameters further comprises:

applying one or more optimization algorithms selected from group consisting of Bayesian optimization, gradient descent, and evolutionary algorithms.

6. The method of claim 1, further comprising:

validating the composite score against a set of standalone metrics; and iteratively refining the evaluation framework in a feedback loop.

7. A system for improving a performance of a large language model with respect to a set of user-defined objectives, the system comprising:

a computer processor;

memory; and instructions stored in the memory and executable by the computer processor to cause the computer processor to perform operations, the operations comprising:

receiving the set of user-defined objectives for evaluating model responses generated by the large language model, wherein the set of user-defined objectives include at least one from semantic accuracy, grammatical soundness, and expert alignment;

based on the user-defined objectives, selecting a set of evaluation metrics from a predefined library;

determining, using the selected set of evaluation metrics, evaluation scores for model responses generated by a large language model, wherein the evaluation scores include a semantic score and a lexical score;

calculating a composite score from the evaluation scores, wherein the composite score is adjusted for divergences between the semantic score and the lexical score, wherein the composite score is calculated as:

$$S_{comp} = \frac{(\alpha * (S_{lex} + b_{lex})^{p_{lex}} + (1 - \alpha) * \alpha * (S_{sem} + b_{sem})^{p_{sem}})^{\frac{1}{p}}}{1 + \lambda \times \text{penalty}}$$

wherein:

$S_{comp}$ is the composite similarity;

$\alpha$ is a weighted hyperparameter;

$S_{lex}$ is a lexical similarity;

$b_{lex}$ is a lexical bias;

$p_{lex}$ is a lexical tuning hyperparameter;

$S_{sem}$ is the semantic similarity;

$b_{sem}$ is a semantic bias;

$p_{sem}$ is a semantic tuning hyperparameter:

p is a mean behavior scaling factor;

$\lambda$ is a penalty scaling factor; and penalty is corrective factor for $S_{lex}$-$S_{sem}$ divergence; and tuning a set of hyperparameters of the large language models based on the composite score, wherein the tuning customizes the large language model according to the user-defined objectives by aligning the performance of the large language model according to the user-defined objectives.

8. The system of claim 7, wherein the operations further comprise:

collecting a set of evaluation data, wherein the evaluation data includes responses from subject matter experts and the model responses generated by the large language models;

preprocessing the collected evaluation data, wherein the preprocessing includes one or more natural language processing techniques to normalize and tokenize the evaluation data.

9. The system of claim 7, wherein the semantic score is calculated from evaluation metrics selected from a ROGUE score, a BLEU score, and combinations thereof.

10. The system of claim 7, wherein the lexical score is calculated from evaluation metrics selected from a BERT-Score, a BART-Score, a METEOR score, and combinations thereof.

11. The system of claim 7, wherein tuning the set of hyperparameters further comprises:

applying one or more optimization algorithms selected from group consisting of Bayesian optimization, gradient descent, and evolutionary algorithms.

12. The system of claim 7, wherein the operations further comprise:

validating the composite score against a set of standalone metrics; and iteratively refining the evaluation framework in a feedback loop.

13. A computer program product for improving a performance of a large language model with respect to a set of user-defined objectives, the computer program product comprising a non-transitory computer-readable medium storing program code that, when executed by a computer processor of a computing system, causes the computing system to perform operations comprising:

receiving the set of user-defined objectives for evaluating model responses generated by the large language model, wherein the set of user-defined objectives include at least one from semantic accuracy, grammatical soundness, and expert alignment;

based on the user-defined objectives, selecting a set of evaluation metrics from a predefined library;

determining, using the selected set of evaluation metrics, evaluation scores for model responses generated by a large language model, wherein the evaluation scores include a semantic score and a lexical score;

calculating a composite score from the evaluation scores, wherein the composite score is adjusted for divergences between the semantic score and the lexical score, wherein the composite score is calculated as:

$$S_{comp} = \frac{(\alpha * (S_{lex} + b_{lex})^{P_{lex}} + (1 - \alpha) * \alpha * (S_{sem} + b_{sem})^{P_{sem}})^{\frac{1}{P}}}{1 + \lambda \times \text{penalty}}$$

wherein:

$S_{comp}$ is the composite similarity;

$\alpha$ is a weighted hyperparameter;

$S_{lex}$ is a lexical similarity;

$b_{lex}$ is a lexical bias;

$p_{lex}$ is a lexical tuning hyperparameter;

$S_{sem}$ is the semantic similarity;

$b_{sem}$ is a semantic bias;

$p_{sem}$ is a semantic tuning hyperparameter;

$p$ is a mean behavior scaling factor;

$\lambda$ is a penalty scaling factor; and penalty is corrective factor for $S_{lex}$-$S_{sem}$ divergence; and tuning a set of hyperparameters of the large language models based on the composite score, wherein the tuning customizes the large language model according to the user-defined objectives by aligning the performance of the large language model according to the user-defined objectives.

14. The computer program product of claim 13, wherein the computing system further performs the operations of:

collecting a set of evaluation data, wherein the evaluation data includes responses from subject matter experts and the model responses generated by the large language models;

preprocessing the collected evaluation data, wherein the preprocessing includes one or more natural language processing techniques to normalize and tokenize the evaluation data.

15. The computer program product of claim 13, wherein the semantic score is calculated from evaluation metrics selected from a ROGUE score, a BLEU score, and combinations thereof.

16. The computer program product of claim 13, wherein the lexical score is calculated from evaluation metrics selected from a BERT-Score, a BART-Score, a METEOR score, and combinations thereof.

17. The computer program product of claim 13, wherein tuning the set of hyperparameters further comprises:

applying one or more optimization algorithms selected from group consisting of Bayesian optimization, gradient descent, and evolutionary algorithms.

* * * * *